May 24, 1966 D. DANIELS 3,252,222
TOOL POSITIONING DEVICE
Filed May 13, 1963 5 Sheets-Sheet 1

INVENTOR.
Dennis Daniels
BY
Hill, Sherman, Meroni, Gross & Simpson
ATTORNEYS

May 24, 1966

D. DANIELS 3,252,222

TOOL POSITIONING DEVICE

Filed May 13, 1963

INVENTOR.
Dennis Daniels
BY
Hill Sherman Meroni Gross & Simpson
ATTORNEYS

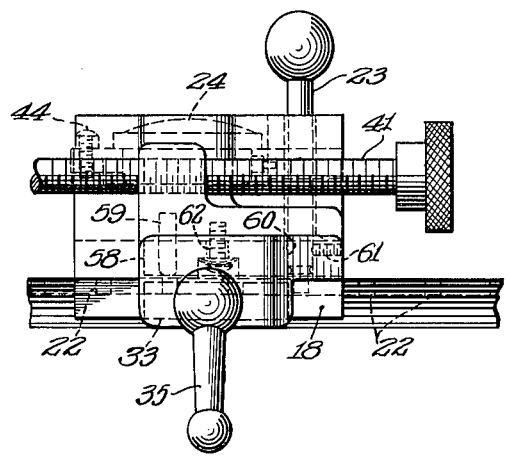
Fig. 4
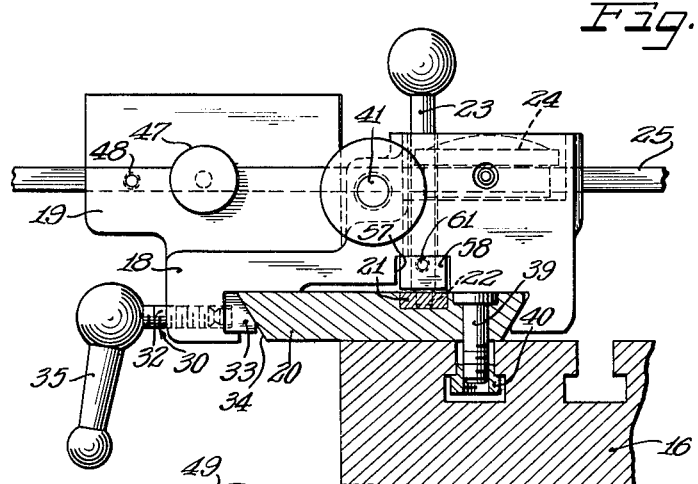
Fig. 5
Fig. 6
INVENTOR.
Dennis Daniels

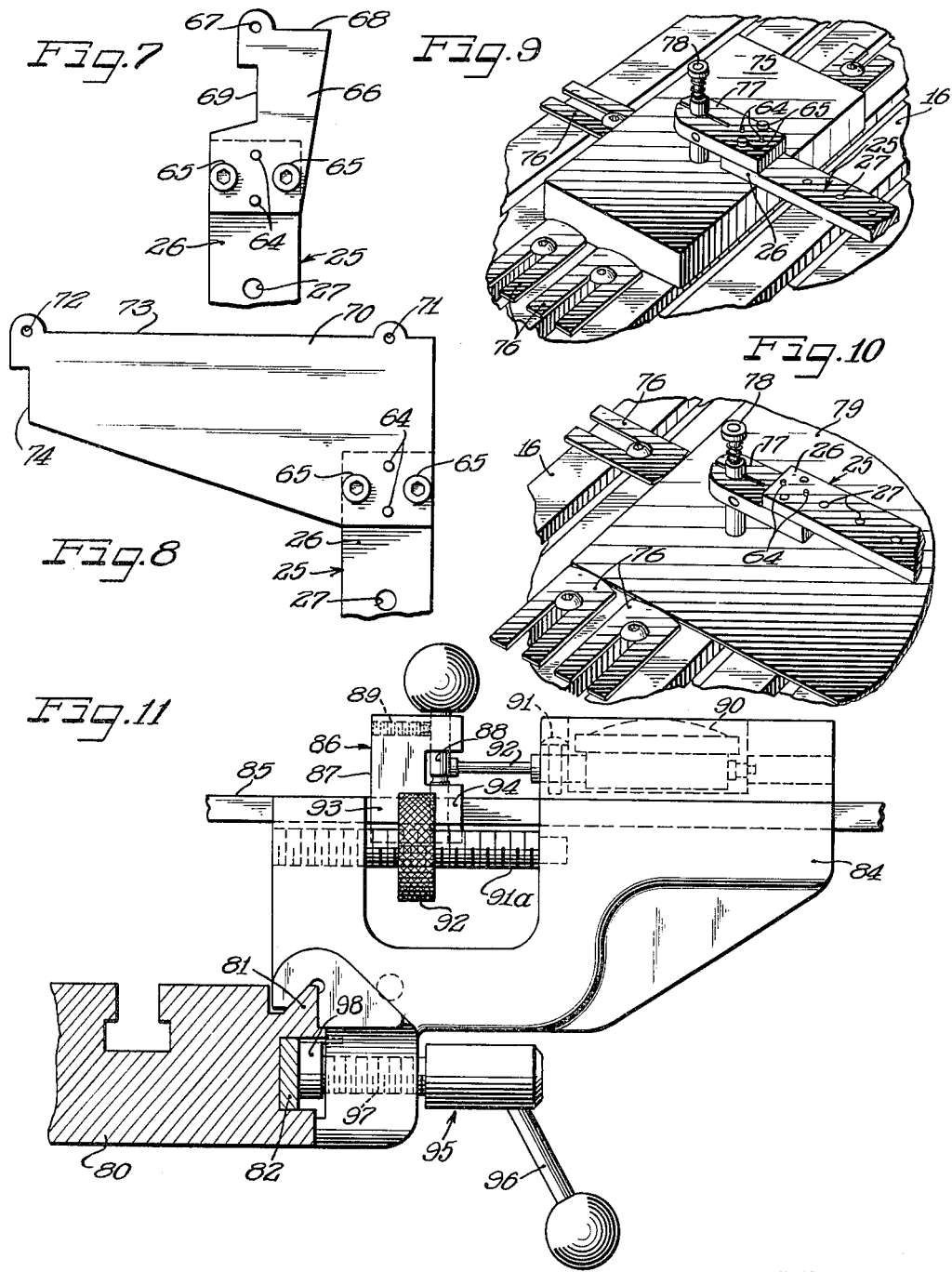

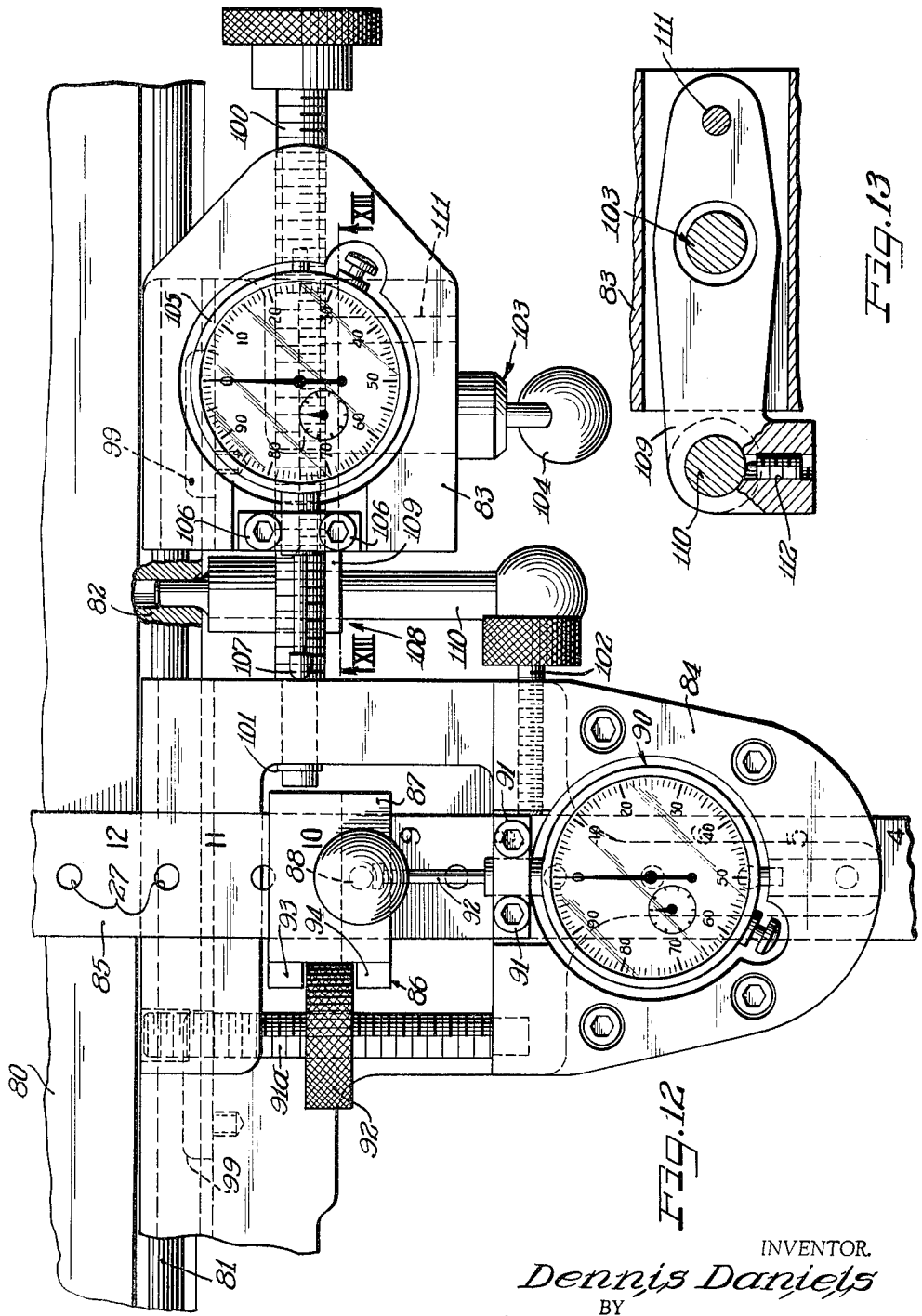

United States Patent Office 3,252,222
Patented May 24, 1966

3,252,222
TOOL POSITIONING DEVICE
Dennis Daniels, Williamsville, N.Y., assignor to Houdaille Industries, Inc., Buffalo, N.Y., a corporation of Michigan
Filed May 13, 1963, Ser. No. 279,794
11 Claims. (Cl. 33—185)

This invention relates to a tool positioning device or apparatus, and more specifically to such means embodying features by which the position of a tool may be accurately adjusted and disposed to a dimensionally defined predetermined position.

Although the principles of the present invention may be included in various positioning means, a particularly useful application is made when the same is employed with a T-slotted bolster plate, such as may be employed to support unitized tooling in a punch press.

Unitized tooling is normally secured to a bolster plate before the bolster plate is installed in a punch press. The location of individual units and stops relative to each other has been established in the past by use of a template disposed between such tooling and the bolster plate, by the use of a template occupying the throats of the various tools in the nature of a workpiece and registering with portions of such tooling or with locator pins received therein, or by use of templates registering with pilot means at the upper surfaces of such unitized tools. In order to employ this method, it is first necessary to construct such a template. Unitized tooling has also been bolted to a bolster plate and jogged into the desired position on a more or less cut and try basis using steel rules, micrometers, and the like to achieve the desired relative positioning. Such a method is slow, cumbersome, and subject to error.

In accordance with the principles of the present invention, a tool positioning device is secured to a bolster plate, and includes a movable arm having reference means engaging the tool to be positioned, the positioning means having suitable scales and direct reading gages so that the tooling may be directly positioned.

Although the moving of unitized tooling about on a bolster plate is one of the primary purposes of the present invention, it may be employed to advantage, as explained later herein, to move other types of tooling about.

Accordingly, it is an object of the present invention to provide a tool positioning device of the direct reading type.

Another object of the present invention is to provide tool positioning means which may be employed with a T-slotted bolster plate.

A further object of the present invention is to provide tool positioning means having various types of reference means by which a variety of tool types may be positioned or located.

A still further object of the present invention is to provide tool positioning means capable of directly reading locational dimensions of any size within the limits of a bolster plate with which the same is employed.

Many other advantages, features and additional objects of the present invention will become manifest to those versed in the art upon making reference to the detailed description and to the accompanying sheets of drawings in which preferred structural embodiments incorporating the principles of the present invention are shown by way of illustrative example.

On the drawings:

FIGURE 4 is a front elevational view in reduced scale of the right-hand portion shown in FIGURE 3;

FIGURE 5 is an elevational view in reduced scale of the right end of the structure shown in FIGURE 3;

FIGURE 6 is an elevational view shown in reduced scale of the left end of the structure shown in FIGURE 3;

FIGURE 7 is an enlarged plan view of a fragmentary portion of the apparatus shown in FIGURE 1;

FIGURE 8 is a plan view of reference means which may be employed in place of that shown in FIGURE 7;

FIGURE 9 is a fragmentary perspective view illustrating the use of the apparatus with other reference means and tooling;

FIGURE 10 is a fragmentary perspective view illustrating a further use of the reference means shown in FIGURE 9;

FIGURE 11 is an end elevational view of a modified form of tool positioning apparatus;

FIGURE 12 is a slightly enlarged top plan view of the apparatus of FIGURE 11; and FIGURE 13 is a fragmentary enlarged cross-sectional view taken along line XIII—XIII of FIGURE 12.

As shown on the drawings:

Figures 1, 2:
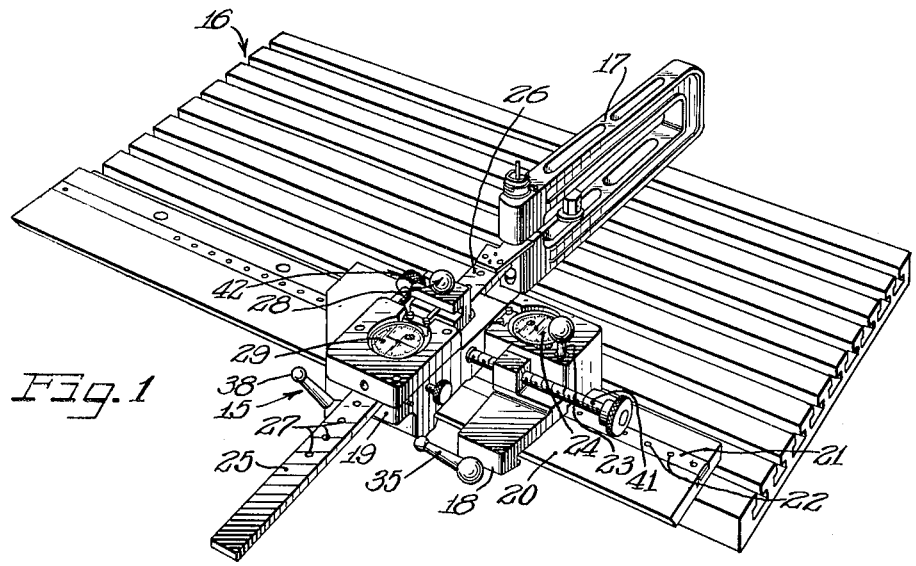
FIGURE 1 is a perspective view of a tool positioning apparatus provided in accordance with the principles of the present invention, the same being illustrated as attached to a T-slotted bolster plate for positioning a representative unitized tooling device.
FIGURE 2 is an enlarged fragmentary perspective view thereof shown from a different angle.
Figure 3:
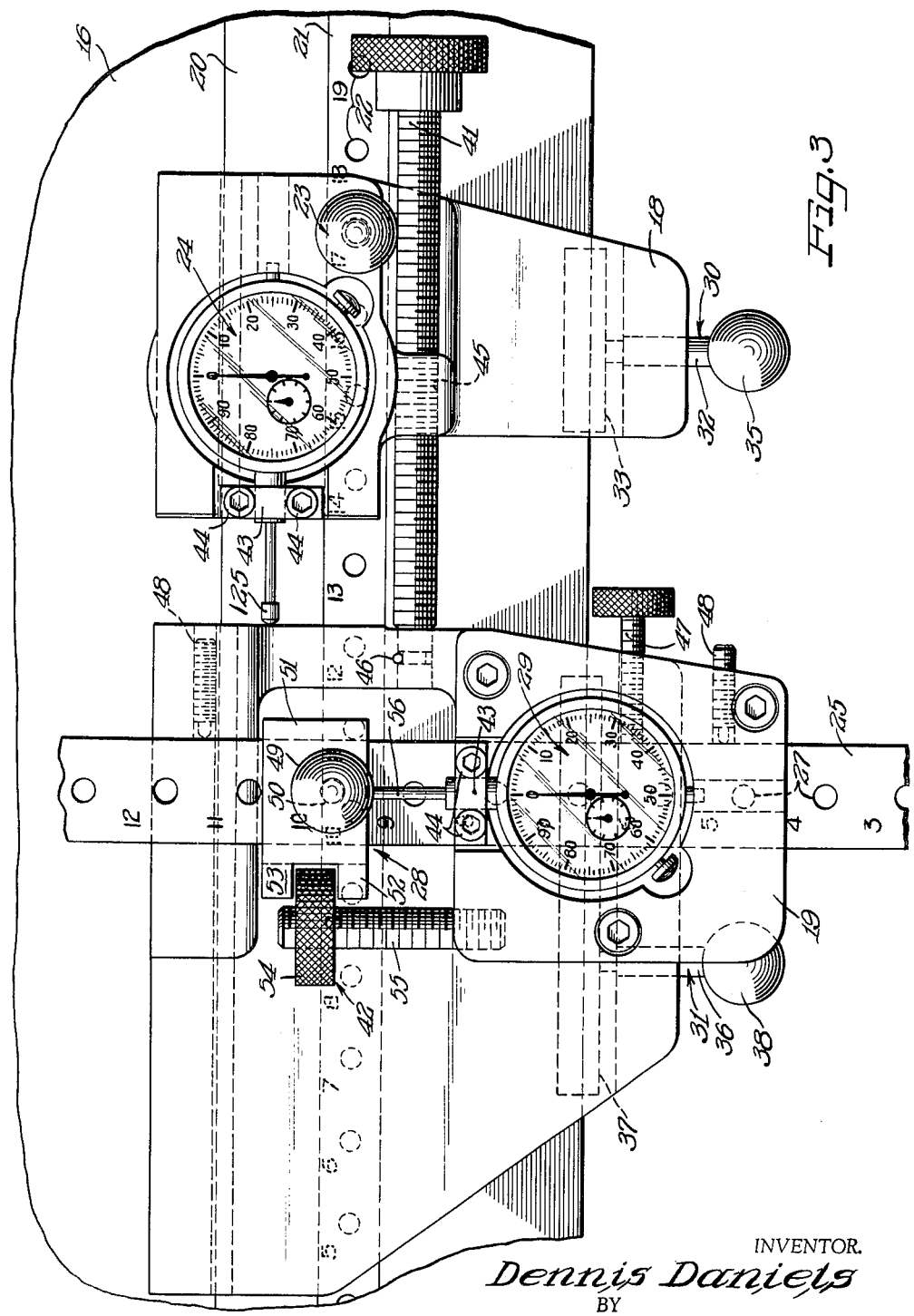
FIGURE 3 is a further enlarged plan view thereof, partially broken away.

The principles of this invention are particularly useful when embodied in a tool positioning apparatus for positioning tooling, such as of the unitized type, with respect to a bolster plate, such tool positioning apparatus being illustrated in FIGURE 1, generally indicated by the numeral 15. The apparatus 15 is secured to a bolster plate 16 which also supports a unitized punching assembly 17, the tooling 17 being representative of tooling which can be accurately positioned by the apparatus 15. The apparatus 15 includes a first housing 18 and a separate second housing 19 slidably supported on an elongated rigid support rail 20. The support rail 20 is provided with a graduated scale 21 fixedly secured thereto, the scale 21 here being in the form of a series of uniformly spaced apertures 22. The spacing between apertures 22 is accurately maintained to be one unit of length, and such apertures may be identified numerically by suitable indicia, such as shown in FIGURE 3.

The housing 18 supports means for locating and holding the housing 18 with respect to the scale 21, such means here including a manually movable pin 23 having a knob at its upper end, and being sized to be selectively received in any of the apertures 22 with a snug fit. The manner of support of the pin 23 is set forth more fully below.

One of the housings 18 and 19, here the housing 18, supports a first direct reading gage 24, the gage 24 here being of the conventional dial indicator type, the same having a spindle 125 (FIGURE 3) engageable with the housing 19 to directly indicate the relative positions of the housings 18 and 19. In that the housing 18 is fixed by the means 23 to the rail 20, the gage 24 together with the scale 21 directly indicates a relative position of the housing 19 with respect to the rail 20, and more specifically directly indicates the relative position of reference means (described below) on the housing 19 with respect to the rail 20.

The housing 19 further supports an elongated rigid positioning arm 25 which has a distal end 26 which is adapted or which is provided with reference means described below for engaging the tool 17. The positioning arm 25 is slidably supported by the housing 19 for movement in a direction perpendicular to the direction in which the rail 20 extends. The positioning arm 25 is also provided with a graduated scale in the nature of a series of uniformly spaced apertures 27 receptive of means generally indicated at 28 with respect to which a second direct reading gage 29, also of the dial indicator type, reacts. The direct reading gage 29 is supported by the housing 19. The direct reading gage 29 directly indicates the relative position between the means 28 and the housing 19, and in that scale apertures 27 are uniformly spaced and calibrated as shown in FIGURE 3, the dial indicator 29 together with the scale 27 of the arm 25 directly indicates the relative position of the reference means at the distal end 26 of the positioning arm 25 with respect to the rail 20.

Referring to FIGURES 5 and 6, the housing 18 is provided with a manual clamp 30, while the housing 19 is provided with a manual clamp 31. The manual clamp 30 includes a screw 32 supported by the housing 18 and having at its inner end a wedging block 33 forming a part of a dovetail connection with the rail 20 which likewise has a corresponding pair of dovetail surfaces such as 34. A handle 35 enables the manual clamp 30 to be tightened or loosened, thereby effecting slight shifting of the housing 18 in a horizontal direction, perpendicular to the length of the rail 20, and perpendicular to the axes of the apertures 22.

The manual clamp 31 includes a similar screw 36 supported by the housing 19 for positioning a wedge block 37 against the dovetail surface 34 in response to movement of a handle 38.

The elongated rigid support rail 20 is detachably clamped to the slotted or upper surface of the bolster plate 16 as is best shown in each of FIGURES 5 and 6. To this end, a number of socket screws 39 are provided, the upper end of each of which is flush with the upper surface of the support rail 20, each of the screws 39 engaging with a non-rotatable nut 40 disposed in one of the bolster plate slots. This structure is particularly advantageous in that the positioning apparatus 15 may be attached or secured to existing bolster plates. Once the appropriate tools 17 have been properly positioned, the apparatus 15 may be entirely removed therefrom by loosening each of the clamps 30 and 31 and retracting the means 23, or by detaching the screws 39.

The housing 19 may be shifted along the length of the rail by means of a manual screw 41 which acts between such housings 18, 19. The positioning arm 25 may be manually shifted in the direction of its length by use of threaded means generally indicated at 42.

As shown in FIGURE 3, the body of the direct reading gage 24 is secured by a clamp 43 and a pair of screws 44 to the housing 18. In a similar manner, the direct reading gage 29 is also secured by a clamp 43 and screws 44 to the housing 19. The positioning screw 41 has a drive connection and a rotatable connection with the housings 18 and 19. In this embodiment, the housing 18 is threaded to form a drive connection as at 45 with the screw 41 while the rotatable connection with the housing 19 is provided by means of a pin 46 fixedly carried by the housing 19 and disposed in a slot or peripheral groove at the end of the screw 41. By rotation of the screw 41 with the clamp 30 tightened, and with the clamp 31 not tight, the housing 19 is translated or moved along the length of the rigid rail 20. When the housing 19 has been positioned as desired by a joint indication of the scale 21 and the gage 24, the clamp 31 may be tightened.

A clamp screw 47 is carried by the housing 19 and acts between it and the positioning arm 25 to lock the position of the arm 25 when the same is disposed as desired. When the clamp screw 47 is not tight, a pair of spring loaded pin assemblies 48, 48 of a known type bear against one edge of the arm 25 so that the left edge of the groove or recess in the housing 19 which supports the arm 25 is used as a reference surface. The spring loaded pins 48 further provide a slight drag on the arm 25 to prevent inadvertent movement thereof.

The means 28 carried by the positioning arm 25 includes a retractable pin having a knob 49 at its upper end and a lower end 50 sized to be snugly received in each of the apertures 27. The means 28 further includes a block 51 having a sliding connection with the arm 25, through which the pin 49 extends. The block 51 includes a pair of bifurcations 52, 53 between which there extends a nut 54 carried on a screw 55 which is fixedly secured to the housing 19 and which is disposed in a direction parallel to the length of the arm 25. The nut 54 and the screw 55 jointly comprise the screw thread means 42, and in that opposite faces of the nut 54 act on the bifurcations 52 and 53, the screw thread means are thus active to shift the positioning arm 25 in a lengthwise direction. The direct reading gage 29 has a spindle 56 which bears directly against the pin 49.

The means by which the pin 23 is supported is best seen in FIGURES 4 and 5. The housing 18 has an internal groove 57 overlying the scale 21 in which there is disposed a connecting link 58 which extends parallel to the rail 20. As seen in FIGURE 4, the left end of the connecting link 58 is pivoted about an axis provided by a pin 59, while the right end of the link 58 includes a close fitting aperture 60 snugly receiving in a slidable manner the pin 23. A spring loaded pin 61, similar to the spring loaded pin 48, is carried by the link 58 to provide suitable detent action therewith. The link 58 is resiliently loaded and supported in an upward direction by a screw and spring washer assembly 62. The end of the connecting link 58 having the aperture 60 may pivot about the axis of the pin 59 by a small amount, represented by the clearance illustrated in FIGURE 5. Such pivoting is effected by the operation of the clamp 30 which can shift the housing 18 slightly to the extent needed to effect clamping and loosening action without imposing a binding force on the pin 23. To obtain this result, the axis of the pin 59 is parallel to the axis of each of the apertures 22.

As seen in FIGURE 6, a further spring loaded pin assembly 63, similar to the spring loaded pin assembly 48, is carried by the block 51 for providing a detent action on the pin 49.

Referring to FIGURE 7, the distal end 26 of the positioning arm 25 is illustrated in detail. The end 26 is provided with a pair of locating pins 64, 64 and suitable apertures which are threaded to receive a pair of screws 65, 65. The distal end 26 supports a reference member 66 by means of the detachable securing means 65 in a position keyed by the pins 64. The reference means 66 includes an aperture 67 the centerline or vertical axis of which is a reference point from which the scales 21 and 27 are dimensioned. The reference member 66 further includes a pair of vertical surfaces 68, 69 disposed perpendicular to each other, and respectively parallel to and perpendicular to the length of the rail 20. The reference means or aperture 67 is employed to receive a pilot pin or tool when the positioning apparatus 15 is employed to read dimensions through a centerline. The reference surfaces 68 and 69 are employed when the positioning apparatus 15 is used to position a stop or other element having an abutment surface with respect to which the dimensions are stated. The screws 65 may be removed and the reference member 66 inverted so that the surface 69 is directable in the opposite lateral direction.

By referring to FIGURES 1 and 3, it will be noted that the housings 18 and 19 extend a considerable distance to the right of the positioning arm 25 and to the left of the positioning arm 25. Assuming that the housing 19 is positioned near the left extreme of the bolster plate 16, there is a certain zone to the left of the positioning arm 25 which the reference means 66 cannot reach. In like manner, there would be a similar zone at the right end of the bolster plate 16. In order to be able to position tools in this zone, a further reference means 70 is provided which is shown in FIGURE 8. The reference member 70 is reversible and includes a reference means or aperture 71 corresponding to the aperture 67, and in addition thereto, a reference aperture 72 offset in a direction parallel to the rail 20 by a distance equal to an integral number of spaces between the apertures 22, such as five such spaces. The reference member 70 includes a vertical surface 73 corresponding to the surface 68, and a vertical surface 74 perpendicular to the surface 73 and corresponding to the surface 69.

FIGURE 9 illustrates a relatively thick workpiece 75 supported on the bolster plate 16 and held in a secure position by a number of clamps 76. In this figure, a reference member 77 is provided which has an aperture with a vertical axis that serves as the reference means, such aperture being fitted with a tool such as a center punch 78 for marking the workpiece 75.

As shown in FIGURE 10, the reference member 77 may be mounted on the opposite surface of the positioning arm 25 to position the center punch 78 somewhat lower for use on a thinner workpiece 79.

Referring to FIGURES 11–13 there is shown a further embodiment of the present invention which in most respects is quite similar to the embodiment described above. A bolster plate 80 of the T-slotted type is provided with an elongated rigid support rail 81 which is integral with such bolster plate, the forward edge of which is grooved and which supports a scale 82 which may be identical to the scale 21. The rigid support rail 81 supports a first housing 83 and a second housing 84.

As seen in FIGURE 11, the housing 84 slidably supports a positioning arm 85 identical to the positioning arm 25, and which carries reference means 86 including a block 87 and a pin 88 slidably supported by the block 87, the lower end of which is receivable in any of the apertures of the positioning arm 85. A spring loaded pin assembly 89 is carried by the block 87 and acts on the pin 88 to provide a drag. Housing 84 supports a direct reading gage 90 such as a dial indicator, which is clamped thereto by a pair of screws 91, the direct reading gage 90 including a spindle 92 bearing against the pin 88. The housing 84 supports a screw 91ᵃ on which there is a threaded nut 92 acting between bifurcations 93, 94 on the block 87 for shifting the block 87 and the positioning arm 85 as a unit together with the pin 88. The housing 84 supports a clamp 95 including a handle 96, a screw 97, and a block 98 for acting against the rigid support rail 81.

As shown in FIGURE 12, each of the housings 83 and 84 is provided with a wear block 99 and are coupled together by a screw 100 having a threaded connection with the housing 83 and a rotatable drive connection with the housing 84, such latter connection including a snap ring 101. The housing 84 includes a clamp screw 102 similar to the clamp screw 47 for holding the positioning arm 85.

The housing 83 includes clamp means generally indicated at 103 including a handle 104, and otherwise similar to the clamp 95. The housing 83 supports a direct reading gage 105 such as of the dial indicator type, which is clamped thereto by means of a pair of screws 106. The direct reading gage 105 includes a spindle 107 which acts against the housing 84.

The housing 83 supports means generally indicated at 108 for locating and holding the housing 83 in a predetermined position, and to this end, the means 108 includes a connecting link 109 and a locating pin 110. The connecting link 109 is pivotably supported by the housing 83 and has an aperture in which the pin 110 is siladably supported for movement into and out of the apertures in the scale 82.

As best seen in FIGURE 13, the connecting link 109 is pivoted on a pin 111, the axis of which is parallel to the axes of the apertures of the scale 82. The connecting link 109 is provided with a relatively large opening through which the clamp means 103 extends and with a spring loaded pin assembly 112 similar to the pin assembly 48 for providing a spring loaded drag on the pin 110 and a detent action. Tightening of the clamp 103 produces slight vertical motion of the housing 83, and therefore slight pivoting of the connecting link 109, thereby precluding any binding between the pin 110 and the scale 82.

The structure and operation of this embodiment is otherwise the same as that of the embodiment first described herein.

Although various minor modifications might be suggested by those versed in the art, it should be understood that I wish to embody within the scope of the patent warranted hereon all such embodiments as reasonably and properly come within the scope of my contribution to the art.

I claim:
1. Tool positioning apparatus comprising in combination:
   (a) an elongated rigid support rail having a series of uniformly spaced apertures disposed along the length thereof;
   (b) first and second housings slidably supported by said rail;
   (c) means receivable in a selected one of said rail apertures;
   (d) a connecting link pivoted to said first housing about an axis parallel to the axes of said apertures and extending substantially parallel to said rail, said link supporting said last named means and thereby holding said first housing at a selected predetermined position along the length of said rail;
   (e) a manually operated clamp carried by said first housing and movable in a direction perpendicular to the axes of said apertures for holding said first housing at a selected position along the length of said rail and for effecting slight pivoting of said connecting link;
   (f) a screw acting between said housings for shifting said second housing along said rail;
   (g) a first direct reading gage acting between said housings for indicating their relative position;
   (h) an elongated rigid positioning arm for engaging the tool and having a graduated scale along the length thereof, said arm being slidably supported by said second housing for movement perpendicular to the direction in which said support rail extends;
   (i) means carried by said positioning arm at a selected position along the length thereof; and
   (j) a second direct reading gage acting between said last named means and said second housing for indicating with said arm scale the position of said arm relative to said rail.

2. Tool positioning apparatus comprising in combination:
   (a) an elongated rigid support rail constructed for support along its length by a bolster plate and having a graduated scale disposed along the length thereof;
   (b) first and second housings slidably supported by said rail for movement along the length of the rail;
   (c) means carried by said first housing for holding said first housing at a selected position along the length of said rail;

(d) a first direct reading gage acting between said housings for indicating with said rail scale the position of a tool relative to the length of said rail;
(e) an elongated rigid positioning arm having fixedly carried means at its distal end for engaging the tool and having a graduated scale along the length thereof, said arm being slidably supported by said second housing for movement in the direction of its length perpendicular to the direction in which said support rail extends;
(f) member carried by said positioning arm at a selected position along the length thereof; and
(g) a second direct reading gage acting between said member and said housing for indicating with said arm scale the spacing of the tool from said rail.

3. Tool positioning apparatus comprising in combination:
(a) an elongated rigid support rail of dovetail cross-section constructed for support along its length by and parallel to a T-slot of a T-slotted bolster plate, said rail having means receptive in such T-slot for detachably clamping said rail to the slotted surface of such T-slotted bolster plate, and said rail having a graduated scale disposed along the length thereof;
(b) first and second housings having slidable supporting connections of dovetail cross-section with said rail for movement along the length of the rail;
(c) means carried by said first housing for holding said first housing at a selected position along the length of said rail;
(d) a first direct reading gage acting between said housings for indicating with said rail scale the position of a tool relative to the length of said rail;
(e) an elongated rigid positioning arm having fixedly carried means at its distal end for engaging the tool and having a graduated scale along the length thereof, said arm being slidably supported by said second housing for movement in the direction of its length perpendicular to the direction in which said support rail extends;
(f) member carried by said positioning arm at a selected position along the length thereof; and
(g) a second direct reading gage acting between said last named means and said second housing for indicating with said scale arm the spacing of the tool from said rail.

4. Tool positioning apparatus comprising in combination:
(a) an elongated rigid support rail constructed for support along its length by a bolster plate and having a graduated scale disposed along the length thereof;
(b) first and second housings slidably supported by said rail for movement along the length of said rail;
(c) means carried by said first housing for holding said first housing at a selected position along the length of said rail;
(d) a first direct reading gage acting between said housings for indicating with said rail scale the position of a tool relative to the length of said rail;
(e) an elongated rigid positioning arm having fixedly carried means at its distal end for engaging the tool and having a graduated scale along the length thereof, said arm being slidably supported by said second housing for movement in the direction of its length perpendicular to the direction in which said support rail extends;
(f) member carried by said positioning arm at a selected position along the length thereof;
(g) a second direct reading gage acting between said last named means and said second housing for indicating with said scale arm the spacing of the tool from said rail; and
(h) a pair of clamps carried by said second housing, one of said clamps individually locking the position of said second housing on said rail, and the other of said clamps individually locking said positioning arm against movement perpendicular to the direction in which said support rail extends.

5. Tool positioning apparatus comprising in combination:
(a) an elongated rigid support rail constructed for support along its length by a bolster plate and having a graduated scale disposed along the length thereof;
(b) first and second housings slidably supported by said rail for movement along the length of said rail;
(c) means carried by said first housing for holding said first housing at a selected position along the length of said rail;
(d) a first direct reading gage acting between said housings for indicating with said rail scale the position of a tool relative to the length of said rail;
(e) an elongated rigid positioning arm having fixedly carried means at its distal end for engaging the tool and having a graduated scale along the length thereof, said arm being slidably supported by said second housing for movement in the direction of its length perpendicular to the direction in which said support rail extends;
(f) member carried by said positioning arm at a selected position along the length thereof;
(g) screw threaded means acting between said last named means and said second housing for shifting said positioning arm lengthwise on said second housing; and
(h) a second direct reading gage acting, independently of said screw threaded means, between said member carried by said positioning arm and said second housing for indicating with said arm scale the spacing of the tool from said rail.

6. Tool positioning apparatus comprising in combination:
(a) an elongated rigid support rail constructed for support along its length by a bolster plate and having a graduated scale disposed along the length thereof;
(b) first and second housings slidably supported by said rail for movement along the length of said rail;
(c) means carried by said first housing for holding said first housing at a selected position along the length of said rail;
(d) a first direct reading gage acting between said housings for indicating with said rail scale the position of a tool relative to the length of said rail;
(e) an elongated rigid positioning arm having fixedly carried means at its distal end for engaging the tool and having a series of uniformly spaced apertures disposed along the length thereof, said arm being slidably supported by said second housing for movement in the direction of its length perpendicular to the direction in which said support rail extends;
(f) a block having a sliding connection with said positioning arm;
(g) a retractable pin carried by said block and receivable in a selected one of said arm apertures; and
(h) a second direct reading gage acting between said pin and said second housing for indicating the spacing of the tool from said rail, and carried by said second housing.

7. A tool positioning apparatus as claimed in claim 2, which includes a screw acting between said housings for shifting said second housing along said rail, the action of said first gage between said housings being independent of said screw.

8. A tool positioning apparatus as claimed in claim 5, wherein said screw threaded means includes
(a) a screw fixed to said second housing and extending parallel to the length of said positioning arm, and
(b) a nut rotatably carried by said screw and having a driving connection with said means carried by said positioning arm.

9. A tool positioning apparatus as claimed in claim 2, wherein said fixedly carried means at the distal end of said positioning arm defines an aperture having a vertical axis with respect to which said gages indicate distances.

10. A tool positioning apparatus as claimed in claim 2, wherein said fixedly carried means at the distal end of said positioning arm comprises a pair of vertical surfaces disposed at a right angle to each other, with respect to which said gages indicate distances.

11. A tool positioning apparatus as claimed in claim 2 which includes means detachably securing said fixedly carried means in a keyed position at the distal end of said positioning arm.

References Cited by the Examiner
UNITED STATES PATENTS

| | | | |
|---|---|---|---|
| 761,328 | 5/1904 | Spalding | 33—165 |
| 2,369,425 | 2/1945 | Becker | 33—185 X |
| 2,458,188 | 1/1949 | Moran | 33—76 |
| 2,594,457 | 4/1952 | Kunzler | 33—169 X |
| 2,676,413 | 4/1954 | Wharton | 33—174 |
| 2,941,303 | 6/1960 | Middlestadt | 33—174 |

ISAAC LISANN, *Primary Examiner.*

LEONARD FORMAN, *Examiner.*